(12) United States Patent
Ishiwata et al.

(10) Patent No.: US 6,806,435 B2
(45) Date of Patent: Oct. 19, 2004

(54) SMALL HOLE ELECTRIC DISCHARGE MACHINE DRILL PROVIDED WITH DEPTH-SPECIFIC PROCESSING MEANS

(75) Inventors: Hiroshi Ishiwata, Kanagawa-ken (JP); Tomoshige Ishiwata, Kanagawa-ken (JP); Shigeharu Yokomichi, Kanagawa-ken (JP)

(73) Assignee: Elenix, Inc., Kanagawa-ken (JP)

( * ) Notice: Subject to any disclaimer, the term of this patent is extended or adjusted under 35 U.S.C. 154(b) by 0 days.

(21) Appl. No.: 10/108,425

(22) Filed: Mar. 29, 2002

(65) Prior Publication Data

US 2002/0148814 A1 Oct. 17, 2002

(30) Foreign Application Priority Data

Apr. 12, 2001 (JP) ..................................... P2001-113882
May 8, 2001 (JP) ..................................... P2001-137691

(51) Int. Cl.[7] .............................. B23H 1/00; B23H 9/14
(52) U.S. Cl. .................................................... 219/69.2
(58) Field of Search .......................... 219/69.12, 69.11, 219/69.2, 69.14

(56) References Cited

U.S. PATENT DOCUMENTS

| | | | |
|---|---|---|---|
| 4,055,988 A | * | 11/1977 | Dutton, Jr. |
| 4,996,762 A | * | 3/1991 | Takayama ................. 219/69.11 |
| 5,174,586 A | * | 12/1992 | Saeda et al. |
| 6,407,385 B1 | * | 6/2002 | Okada ......................... 250/306 |
| 6,443,295 B1 | * | 9/2002 | Yasuda |
| 6,576,858 B1 | * | 6/2003 | Yokomichi ................. 219/69.2 |

FOREIGN PATENT DOCUMENTS

| | | | |
|---|---|---|---|
| JP | 62-282825 A | * | 12/1987 |
| JP | 9-174340 A | * | 7/1997 |
| JP | 2000-202715 A | * | 7/2000 |

* cited by examiner

*Primary Examiner*—Geoffrey S. Evans
(74) *Attorney, Agent, or Firm*—Greenblum & Bernstein, P.L.C.

(57) ABSTRACT

A small hole electric discharge machine drill is provided with a depth-specific processor and a tiltable unit operable in fluid. The turntable unit includes a first axis with a first center of rotation and a second tilting axis with a second center of rotation. The turntable unit is provided inside a work tank that may be filled with fluid. The small hole electric discharge machine drill includes an electrode for small hole processing.

9 Claims, 6 Drawing Sheets

SMALL HOLE ELECTRIC DISCHARGE MACHINE DRILL PROVIDED WITH DEPTH-SPECIFIC PROCESSING MEANS

BACKGROUND OF THE INVENTION

The present invention relates to a small hole electrical discharge machining method and a small hole electrical discharge machining apparatus.

FIG. 1 is a view showing one example of a related small hole electrical discharge machining apparatus 100. In the small hole electrical discharge machining apparatus 100, a processing vat 101 filled up with processing fluid is provided on an X-Y table 103, and a work W is fixed to a jig 105 in the processing vat.

Above the processing vat 101, a rotary spindle 1009 having an electrode 107 attached thereto is provided on a machining head 111. The machining head 111 is provided so as to be freely moved in a vertical direction (Z axis direction) by a servomotor Mz. Moreover, the rotary spindle 109 is set to be rotatively driven by a motor Ms fixed to the machining head.

For example, when a small hole having a diameter of 0.2 mm or less is machined in the related small hole electrical discharge machining apparatus 100, as shown in FIG. 2, a reverse discharge has been heretofore made to be generated between a rather thick electrode material 113 and a metal block 115 to form an electrode portion 117 having a fine electrode diameter d in accordance with a diameter of a hole to be machined, and the electrode portion 117 has been used as an electrode.

SUMMARY OF THE INVENTION

However, a length l of the electrode portion 117 is limited to fifth to tenth times the diameter d of the electrode portion 117 due to a factor such as buckling and vibration of the electrode portion 117 during machining. Hence, in the discharge machining in which an electrode corrodes away, there is a problem that the number of holes which can be continuously machined is small.

Moreover, in fabricating the electrode portion 117 by the reverse discharge, since corrosion of the metal block 115 cannot be completely eliminated, it is essential to confirm a finished dimension of the electrode diameter d. For confirming the dimension, the electrode 107 is detached from the rotary spindle 109, and measurement thereof by use of a microscope and the like is repeated. Thus, the electrode portion is finished in a desired dimension. Therefore, productivity in the small hole electrical discharge machining is not enhanced.

The present invention was made in order to solve the problem as described above. An object of the present invention is to provide a small hole electrical discharge machining method capable of using a thin and long stick-shaped electrode, for which fabrication of an electrode tip thereof is not required, and a small hole electrical discharge machining apparatus having high productivity.

As means for achieving the above-described subjects, the small hole electrical discharge machining method of the present invention is a method for a small hole electrical discharge machining apparatus including an electrode holding member for holding an upper portion of a stick-shaped or pipe-shaped electrode, and an electrode guiding member for guiding a lower portion of the electrode. Moreover, the electrode holding member is provided with a jet nozzle for generating a water jet. The method is characterized in that the electrode is fed to a work while being rotated simultaneously when the electrode is guided by use of the water jet.

Moreover, a small hole electrical discharge machining apparatus of the present invention is characterized by including: a slide base; a Z axis slide freely positionable in a verticle direction, the Z axis slide being provided on the slide base; an electrode holding member for holding an upper portion of a stick-shaped or pipe-shaped electrode, the electrode holding member being provided on the Z axis slide so as to be freely rotatable; an electrode guiding member for guiding a lower portion of the electrode, the electrode guiding member being provided on the slide base; and an electrode member, the electrode motor being provided on the Z axis slide. In the apparatus, the electrode holding member is provided with a jet nozzle for guiding the electrode by use of a water jet.

Moreover, in the small hole electrical discharge machining apparatus, the electrode guiding member is characterized by including; a guide unit provided with an electrode guide made of ceramics; a guide unit provided with an electrode guide made of ceramics; a funnel for guiding the water jet to a center of the guide unit; and a splash preventing member for preventing splash of the water jet.

DESCRIPTION OF THE PREFERRED EMBODIMENT

Hereinafter, description will be made for an embodiment of the present invention with reference to the drawings.

Figure 3:
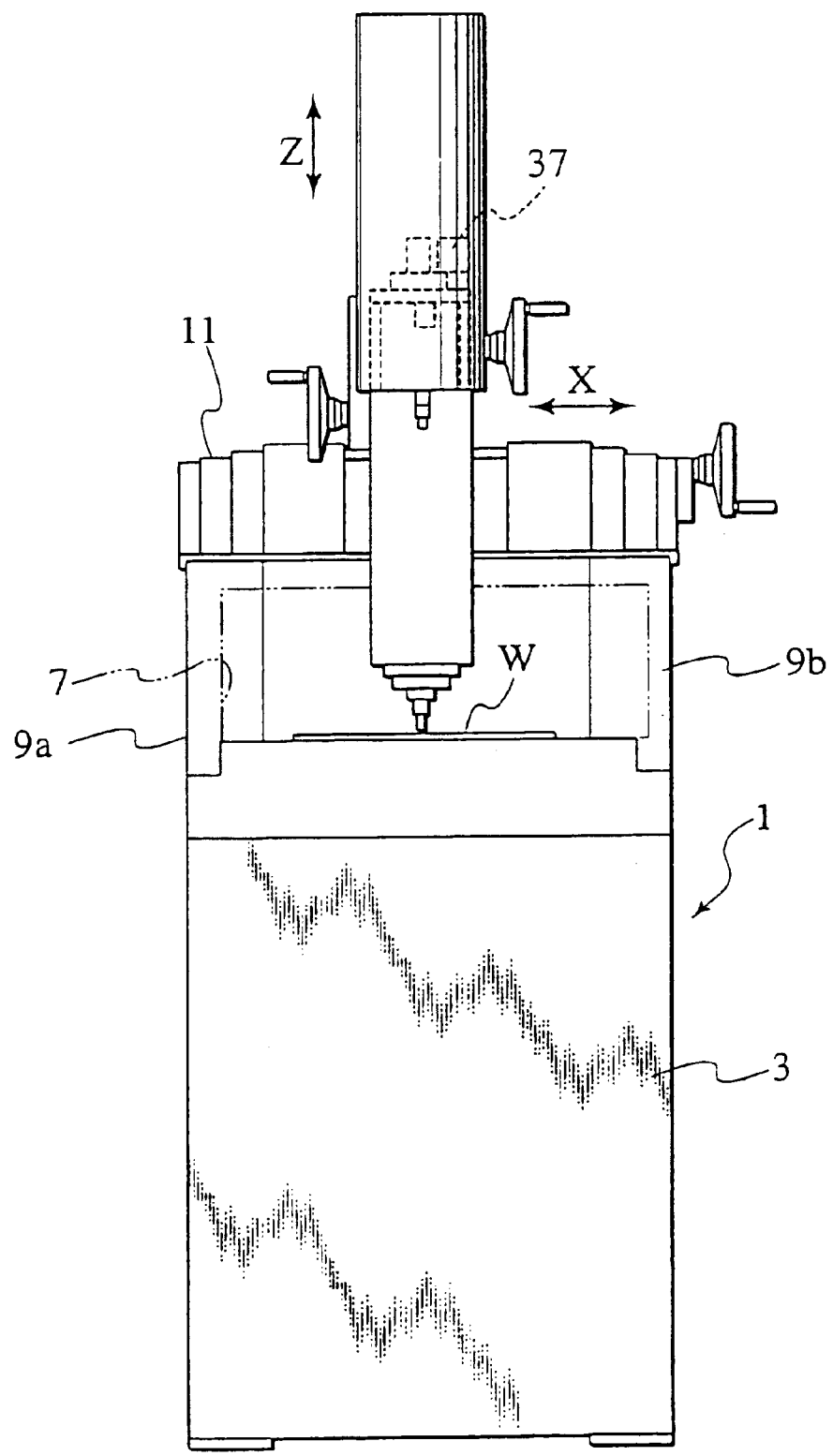
FIG. 3 is a front view of a small hole electrical discharge machining apparatus according to the present invention.
Figure 4:
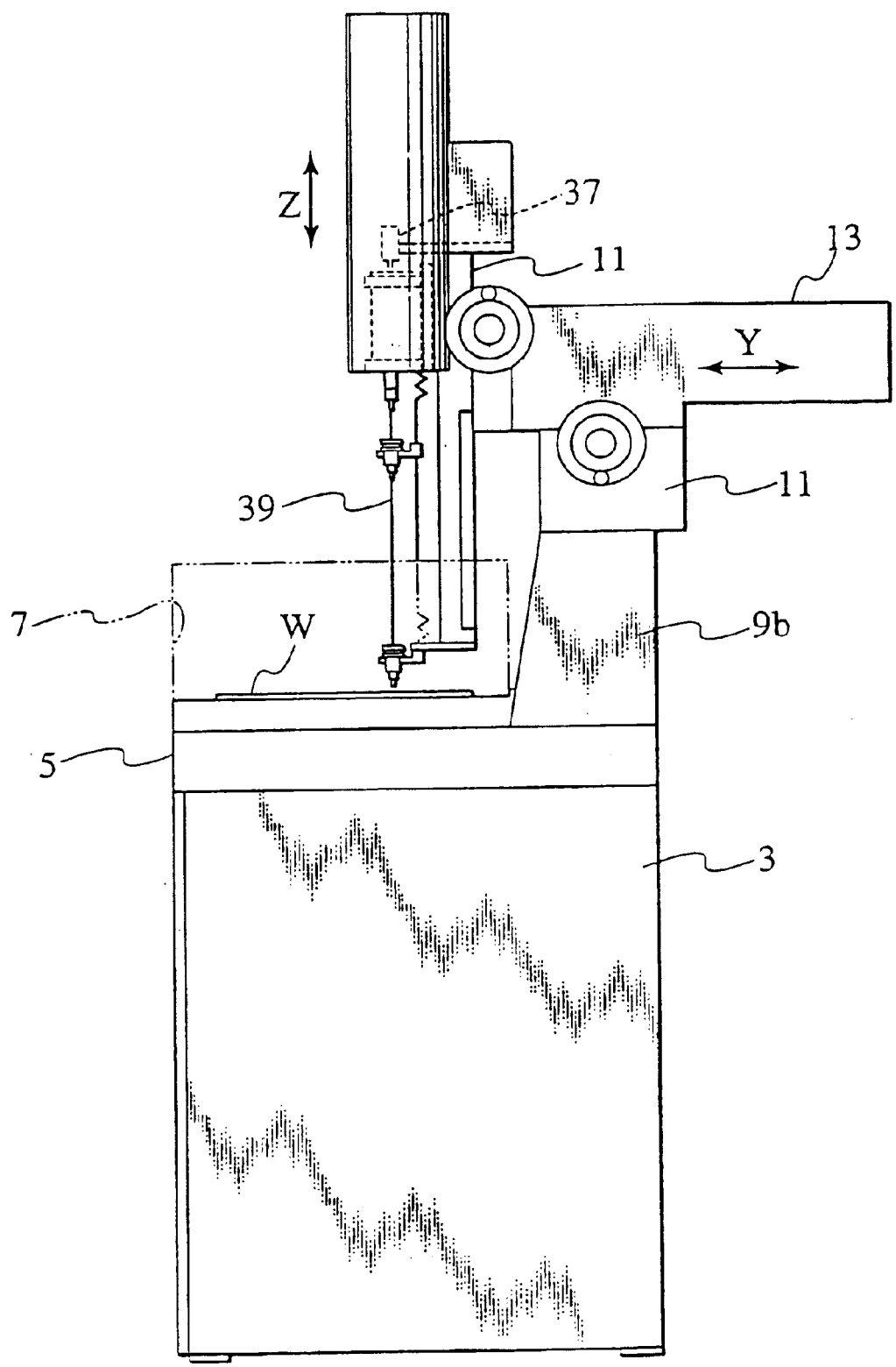
FIG. 4 is a right side view of the small hole electrical discharge machining apparatus according to the present invention.

FIGS. 3 and 4 are a front view and a side view of a small hole electrical discharge machining apparatus according to the present invention, respectively. A worktable 5 for fixing a work W thereon is provided on a pedestal 3 of a small hole electrical discharge machining apparatus 1. On the worktable 5, a processing vat 7 for accommodating the work W therein is provided. Moreover, on the rear side of the worktable 5 (right side in FIG. 4), columns 9a and 9b extending upward from the worktable 5 are provided.

On the above-described columns 9a and 9b, an X axis carriage 11 freely movable and positionable in an X direction (right-and-left direction in FIG. 3) is provided. Moreover, on the X axis carriage 11, a Y axis carriage 13 freely movable and positionable in a Y direction perpendicular to the X direction is provided.

Figure 5:
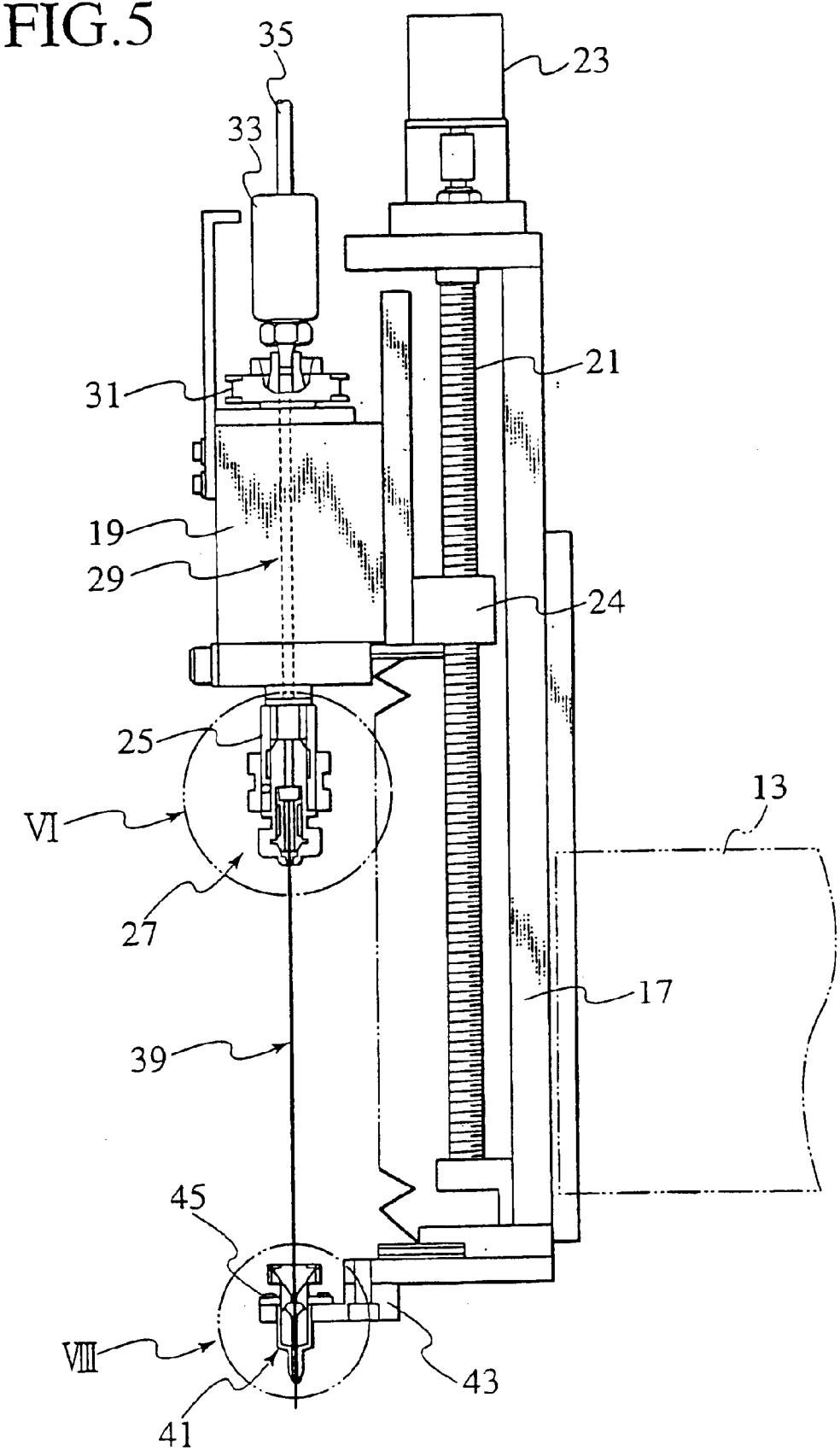
FIG. 5 is an enlarged view of a Z axis slide portion in FIG. 4.

With reference to FIG. 4, a slide base 17 is engaged with a front end (left-side end in FIG. 4) of the above-described Y-axis carriage 13 so as to be vertically movable. With reference to FIG. 5, a Z axis slide 19 is engaged with the slide base 17 by an unillustrated guide so as to be freely movable vertically.

A shaft of a Z axis feed screw 21 extending in a Z direction is supported on the slide base 17 so as to be freely rotatable. On an upper end of the Z axis feed screw 21, a servomotor 23 for rotatably driving the Z axis feed screw 21 is provided. Moreover, a nut 24 fitted to the Z axis slide 19 is screwed to the Z axis feed screw 21.

Hence, the Z axis screw 21 is rotatively driven in an appropriate manner by the above-described servomotor 23 under control of an unillustrated control device, whereby the Z axis slide 19 can be moved to a desired position in the Z direction.

On a lower portion of the above-described Z axis slide 19, an electrode holding 27 provided with one-touch coupler 25 is provided so as to be freely rotatable. Moreover, to the electrode holding member 27, a hollow rotation shaft 29 extending to the upper portion of the Z axis slide 19 is fixed with the one-touch coupler 25 interposed therebetween. On the upper end of the rotation shaft 29, a pulley 31 such as a timing pulley for driving a rotation shaft is provided. Moreover, the upper end of the hollow rotation shaft 29 is coupled to an unillustrated water supply device via a pipeline 35 with a rotary joint 33 interposed therebetween. Moreover, the pulley 31 is coupled to a drive pulley (not shown) provided in the electrode motor 37 for rotating an electrode via a drive belt (not shown).

Hence, water supplied from the water supply device will be supplied through a hollow portion of the hollow rotation shaft 29 to the electrode holding member 27. Moreover, the electrode holding member 27 can be rotatively driven by the electrode motor 37 for rotating the electrode.

Below the electrode holding member 27, an electrode guiding member 41 for guiding a tip of a stick-shaped or pipe-shaped electrode 39 is provided. The electrode guiding member 41 is fixed to a support plate 43 provided integrally on the lower end of the slide base 17 by a fastening member 45 such as a bolt.

For example, even a stick-shaped or a pipe-shaped electrode having a fine line diameter of about 0.030 mm to 0.200 mm can be fed to the electrode guiding member without being bent by a reaction force due to friction between the electrode and the above-described electrode guide.

Figure 6:
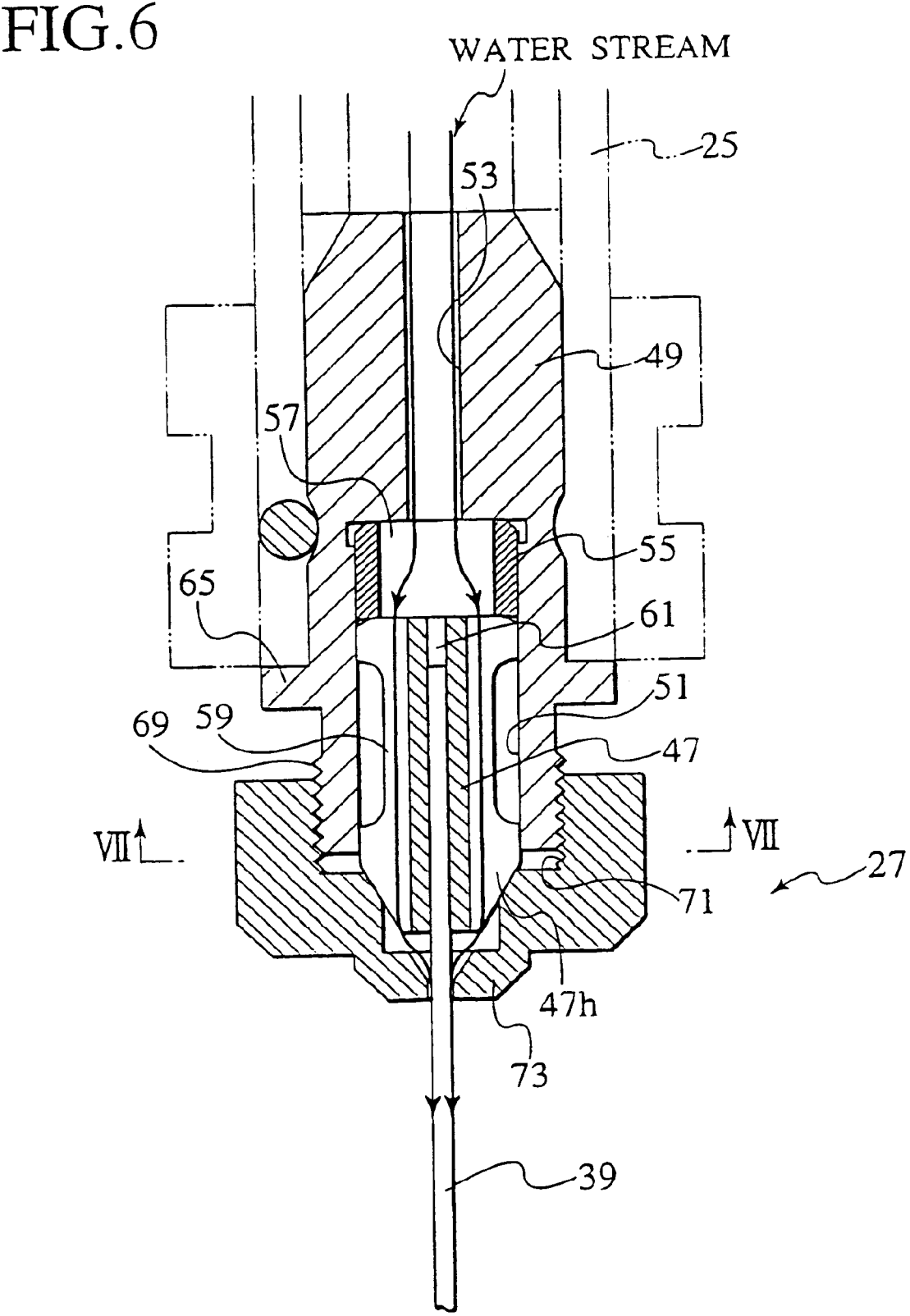
FIG. 6 is an enlarged explanatory view of the portion VI in FIG. 5.

As shown in FIG. 6, the electrode holding member 27 includes a collet 47 for holding the end of the fine stick-shaped or pipe-shaped electrode 39. The collet 47 is detachably inserted into a collet holding for the end of the fine stick-shaped or pipe-shaped electrode 39. The collet 47 is detachably inserted into a collet holding hole 51 open downward, which is provided in a collet holder 49 for holding the collet 47. Moreover, in the collet holding hole 51, a water path 53 communicating with a hollow hole of the rotation shaft 29 is provided.

Between the upper portion of the collet holding hole 51 and the collet 47, a ring spacer 55 having an approximately equal diameter to that of the collet 47 is inserted. Moreover, inside the ring spacer, a reserve chamber 57 for reserving water from the water path 53 is defined.

Figure 7:
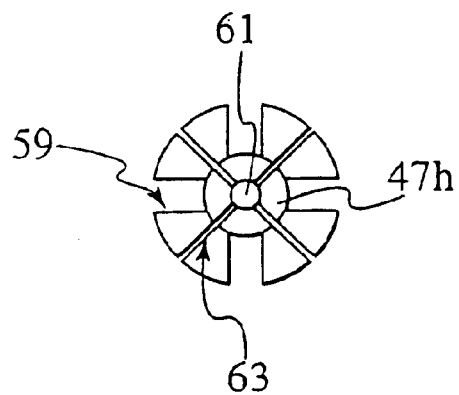
FIG. 7 is a sectional view of a collet in FIG. 6, taken along a line VII—VII.

As shown in FIGS. 6 and 7, on an outer circumference of the collet 47, four water grooves 59 communicating with a tip 47h of the collet 47 and the reserve chamber 53 is defined.

Note that, in the tip 47h of the collet 47, cross-shaped cut grooves 63 reaching a chuck hole 61 of the collet 47 is provided so that the tip 47h can be elastically deformed readily. Moreover, on a lower outer circumference of the collet holder 49, a talon-shaped engaging portion 65 abutting on the lower end of the one-touch coupler 25 is provided.

On the lower end of the collet holder 49, a collet fixing member 67 that is engaged with a tapered portion of the tip of the collet 47 and tightens the collet 47 is provided. The collet fixing member 67 includes a female screw 71 screwed to as male screw 69 in the lower end of the collet holder 49. The collet fixing member 67 is rotated, thus making is possible to release or fix the collet 47.

Moreover, in the above-described collet fixing member 67, a jet nozzle 73 is provided, which turns water flown out downward from the four water grooves 59 of the collet 47 into a water jet WJ and injects the water jet WJ so that the water can surround the stick-shaped or pipe-shaped electrode 39.

Figure 8:
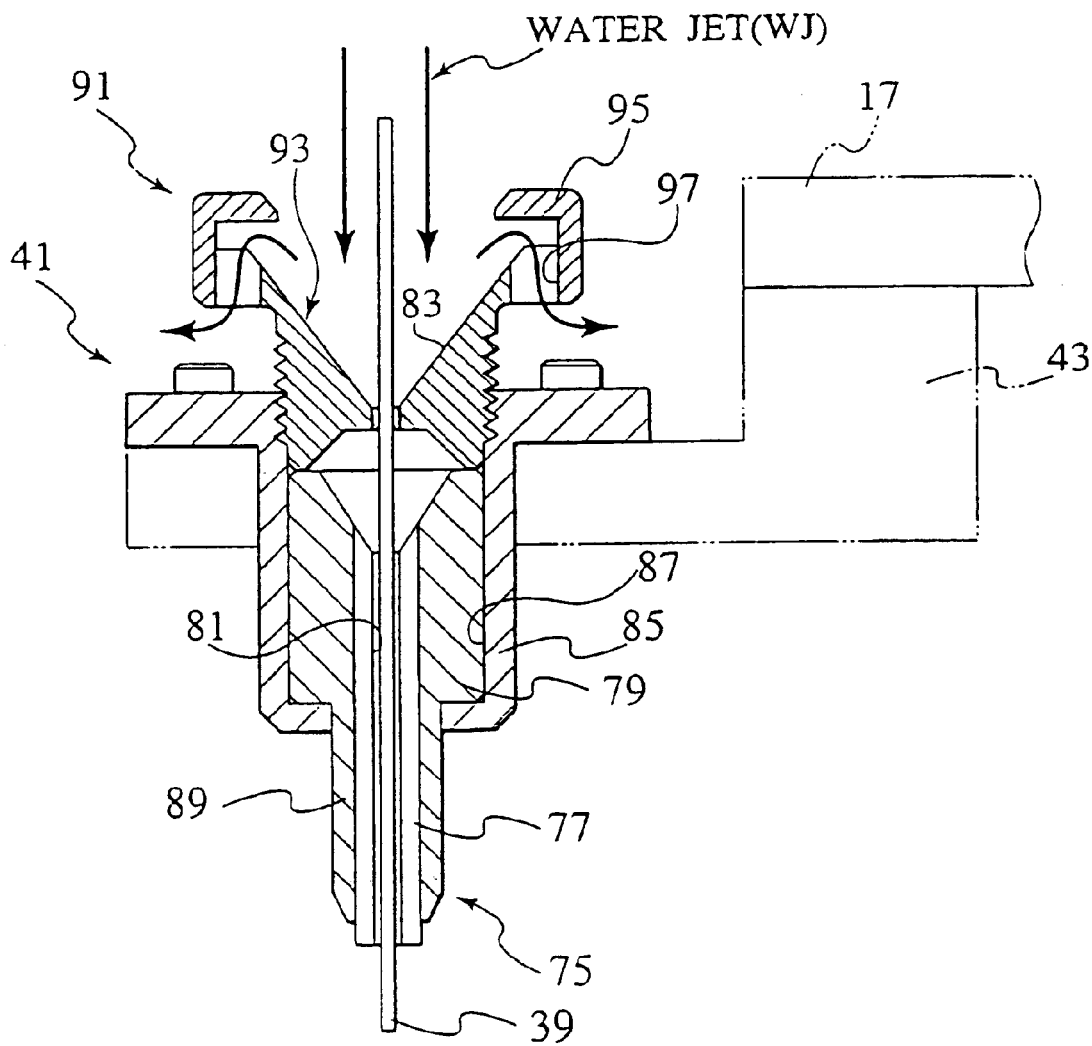
FIG. 8 is an enlarged explanatory view of a portion VIII in FIG. 5.
Figure 1:
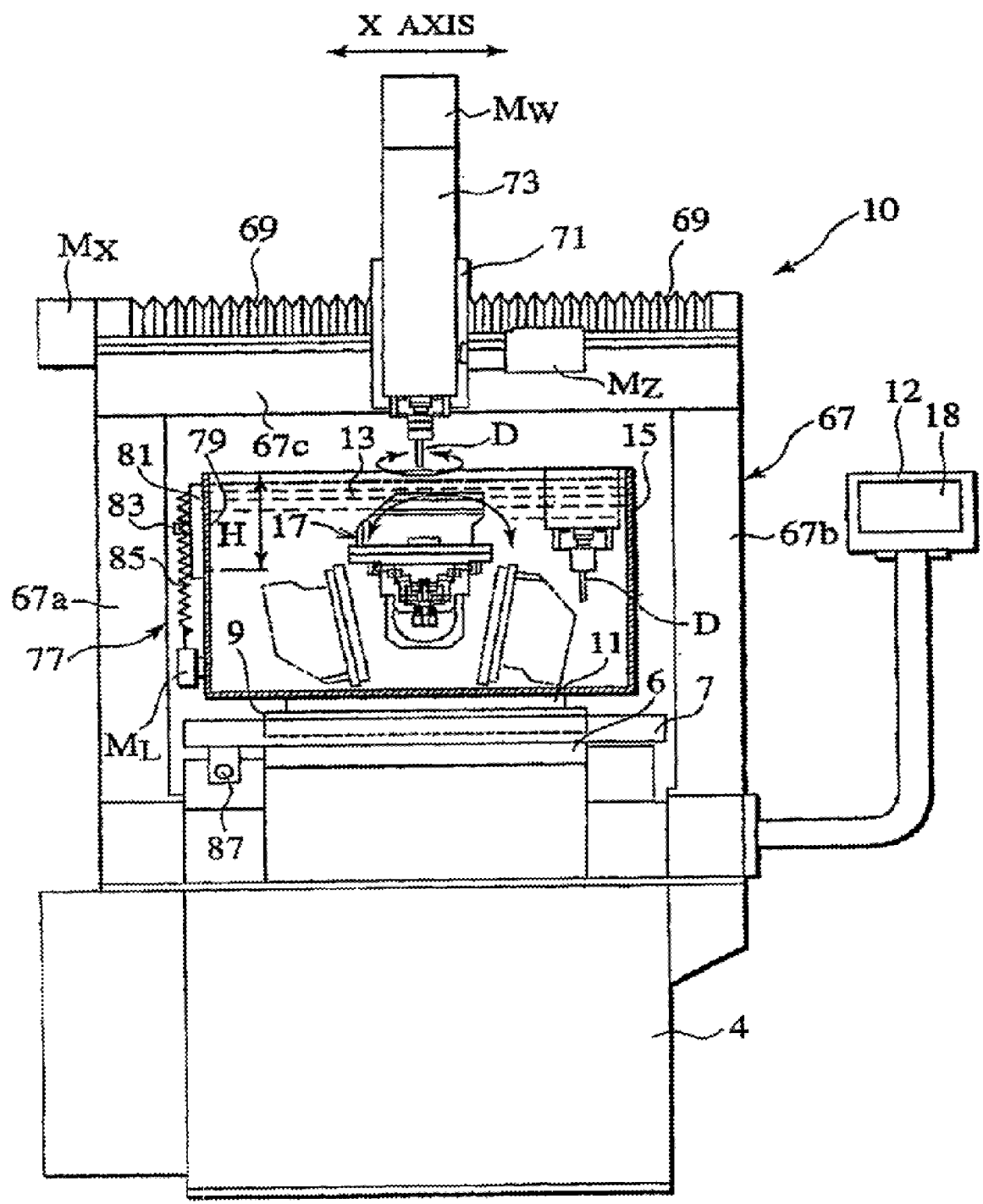
Figure 2:
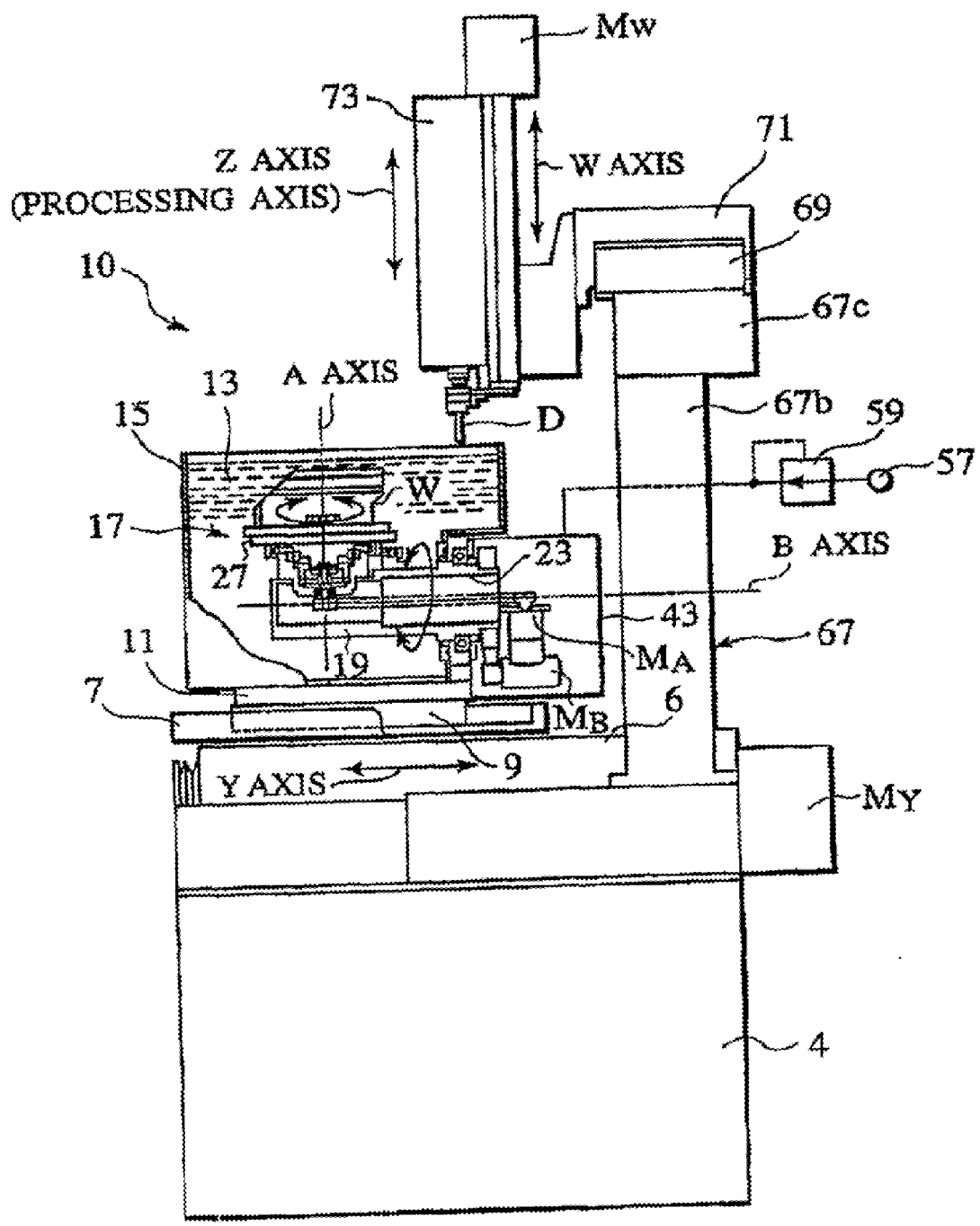
Figure 6:
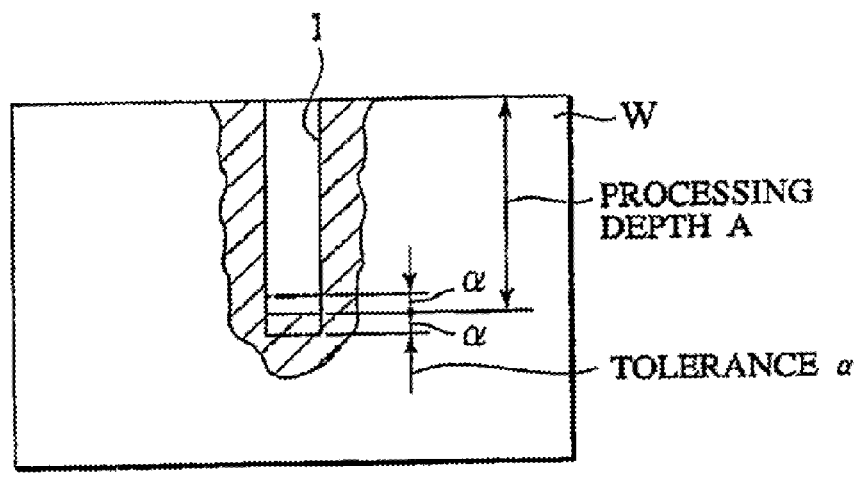
Figure 7:
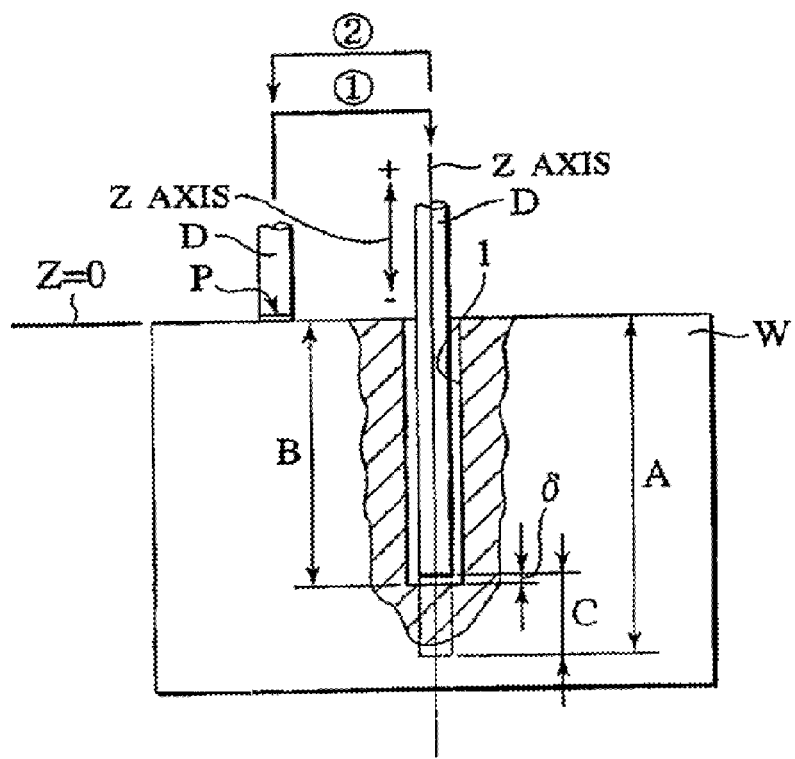
Figure 8:
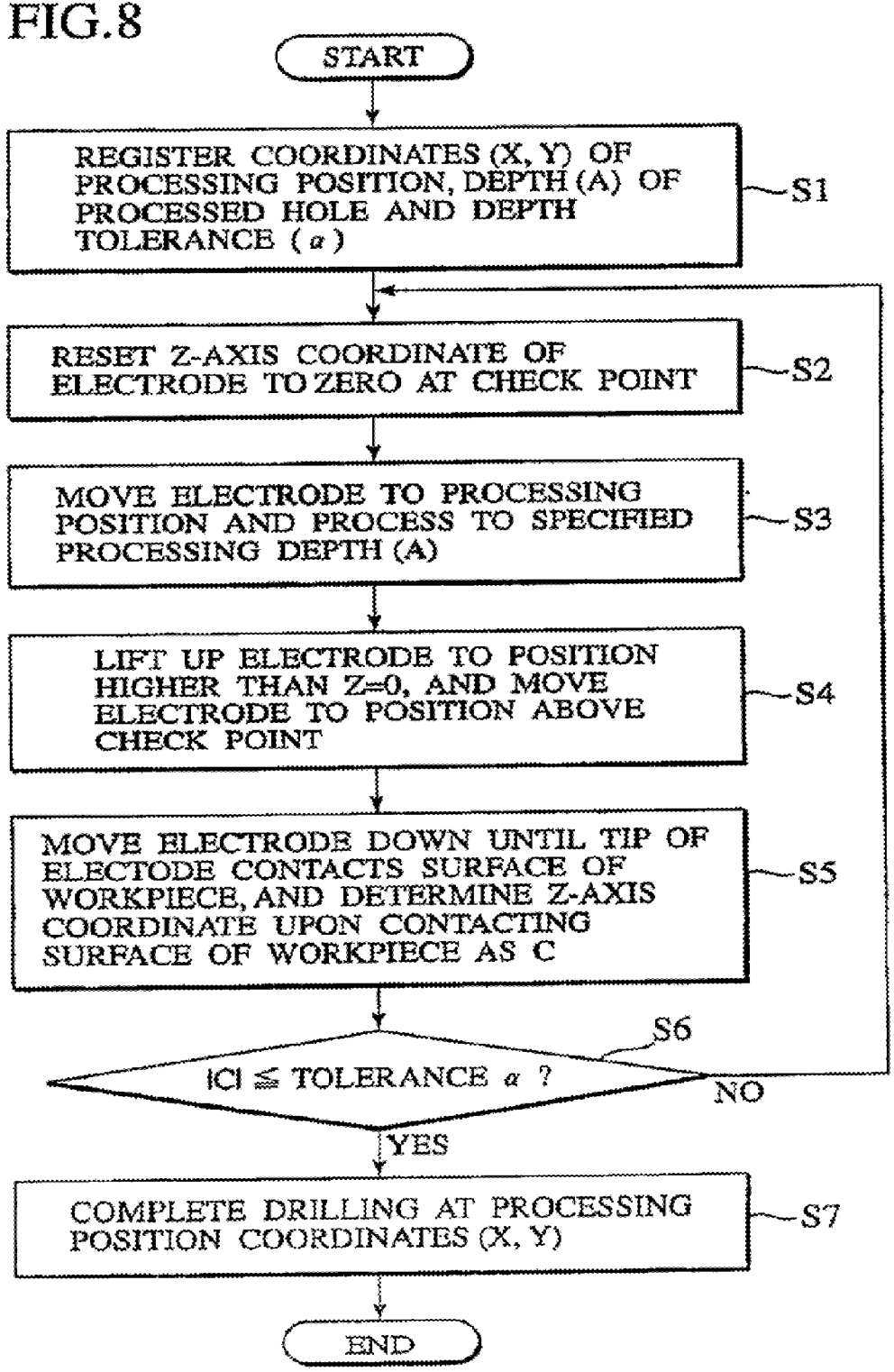

Meanwhile, as shown in FIG. 8, in the electrode guiding member 41, a guide unit 75 for vertically guiding the lower end of the stick-shaped or pipe-shaped electrode 39 attached to the electrode holding member 27 is provided. The guide unit 75 is fabricated by forcibly inserting an electrode guide 77 made of ceramics into a support 79 made of a material having high tenacity e.g., metal). In the guide unit 75, a weak point of the ceramics is supplemented, in that the ceramics is frangible though the ceramics has high abrasion resistance.

Moreover, in the upper portion of the above-described guide unit 75, a funnel portion 83 for collecting a water stream into a guide hole 81 is provided. Note that an outer diameter of the upper portion of the guide unit 75 is set to be somewhat larger than that of the lower portion thereof.

The above-described guide unit 75 is attached to a guide holder 85 so that a step portion of the guide unit 75 is allowed to abut on the bottom of the guide holder 85.

Moreover, on an upper portion of the guide unit 75, a splash preventing member 91 for preventing splash of the water jet WJ on the periphery is provided so as to be detached from the guide holder 85.

The splash preventing member 91 includes a funnel 93 for guiding the water jet WJ to the center of the guide unit 75 and a cover unit 95 for turning downward the water splashing upward on the funnel 93. Moreover, in the cover 95, a plurality of drain holes 97 for draining the water reflected on the upper portion of the cover are provided.

In order to attach the splash preventing member 91 to the guide holder 85, a female screw is provided on the upper portion of the attachment hole 87 of the guide holder 85, and a male screw screwed to the female screw is provided on an outer circumference of the funnel 93. Hence, the guide unit 75 can be fixed with pressure to the guide holder 85 simultaneously when the splash preventing member 91 is screwed to the guide holder 85.

Note that the above-described guide holder 85 is fitted to the support plate 43 provided integrally with the slide base 17. Moreover, for the fluid for guiding the stick-shaped or pipe-shaped electrode 39, processed oil for use in the electrical discharge machining can be also used.

In the case where the small hole is subjected to electrical discharge machining in the electrical discharge machining device constituted as described above, when the upper portion of the stick-shaped or pipe-shaped electrode 39 is attached to the collet 47 of the electrode holding member 27, and water is fed from the water supply device to the electrode holding member 27, then the water passes through the reserve chamber 57 of the electrode holding member 27 and the water grooves on the outer circumference of the collet 47, and the water jet surrounding the circumference of the electrode is injected from the jet nozzle 73. Thus, it is made possible to straightly guide the stick-shaped or pipe-shaped electrode 39 from the electrode holding member to the electrode guiding member 41.

Moreover, since the electrode is surrounded by the water jet, flexure (jump rope phenomenon) of the electrode generated due to the rotation of the electrode can be suppressed, and high-precision small hole machining can be carried out. In addition, fusion cutting of the electrode due to heating caused by the electrical discharge machining can be prevented.

Note that, since a thin and long stick-shaped electrode can be used, for which fabrication of an electrode tip thereof is not required, productivity in the small hole electrical discharge machining can be improved. In this embodiment, machining can be carried out under conditions where the line diameter of the electrode is 0.070 mm and the length thereof is about 220 mm.

What is claimed is:

1. A small hole electric discharge machine drill comprising:
    a turntable having rotation axes of a first axis, of which a center of rotation is defined as a shaft center parallel to a processing axis, and a second axis, of which a center of rotation is defined as a shaft center orthogonal to the first axis,
    wherein the turntable is provided inside a work tank for filling a working fluid therein; and
    a fluid level controller for controlling a fluid level of the working fluid inside the work tank in a level slightly higher than a surface of a workpiece.

2. The small hole electric discharge machine drill according to claim 1,
    wherein the fluid level controller comprises:
    a notch provided on a side wall of the work tank from an upper portion thereof downward;
    a gate which ascends and descends along the notch;
    a nut member fitted to the gate; and
    a driving portion which rotates the nut member, and
    the excess working fluid is allowed to overflow from the notch by moving the gate up and down by the driving portion.

3. A small hole electric discharge machine drill comprising:
    a drilling electrode configured to be movable along a processing axis of the small hole electric discharge machine drill, and
    a turntable having rotation axes of a first axis, of which a center of rotation is defined as a shaft center parallel to the processing axis, and a second axis, of which a center of rotation is defined as a shaft center orthogonal to the first axis,
    wherein the turntable is provided inside a work tank configured to be filled with a working fluid.

4. The small hole electric discharge machine drill according to claim 3,
    wherein the turntable is disposed rotatably on one end inside the work tank of a second axis rotating shaft which extends from an outside of the work tank to an inside thereof,
    the second axis rotating shaft is provided with a blind hole which has an opening outside the work tank and extends to an end portion inside the work tank,
    a first axis drive motor is provided outside the work tank via the blind hole for rotating the turntable, and
    a second axis drive motor is provided outside the work tank for driving the second axis rotating shaft.

5. The small hole electric discharge machine drill according to claim 4, further comprising:
    an air chamber to shut out outside air from the blind hole of the second axis rotating shaft,
    wherein the first axis drive motor and the second axis drive motor are disposed inside the air chamber, and
    air at about 1.1 atm. is always supplied to the air chamber from a pneumatic source.

6. The small hole electric discharge machine drill according to claim 3, further comprising:
    a fluid level controller for controlling a fluid level of the working fluid inside the work tank in a level slightly higher than a surface of a workpiece.

7. The small hole electric discharge machine drill according to claim 6,
    wherein the fluid level controller comprises:
    a notch provided on a side wall of the work tank from an upper portion thereof downward;
    a gate which ascends and descends along the notch;
    a nut member fitted to the gate; and
    a driving portion which rotates the nut member, and
    the excess working fluid is allowed to overflow from the notch by moving the gate up and down by the driving portion.

8. A small hole electric discharge machine drill comprising:
    a turntable having rotation axes of a first axis, of which a center of rotation is defined as a shaft center parallel to a processing axis, and a second axis, of which a center of rotation is defined as a shaft center orthogonal to the first axis,
    wherein the turntable is provided inside a work tank for filling a working fluid therein, and
    wherein the turntable is disposed rotatably on one end inside the work tank of a second axis rotating shaft which extends from an outside of the work tank to an inside thereof,
    the second axis rotating shaft is provided with a blind hole which has an opening outside the work tank and extends to an end portion inside the work tank,
    a first axis drive motor is provided outside the work tank via the blind hole for rotating the turntable, and
    a second axis drive motor is provided outside the work tank for driving the second axis rotating shaft.

9. The small hole electric discharge machine drill according to claim 8, further comprising:
    an air chamber to shut out outside air from the blind hole of the second axis rotating shaft,
    wherein the first axis drive motor and the second axis drive motor are disposed inside the air chamber, and
    air at about 1.1 atm. is always supplied to the air chamber from a pneumatic source.

* * * * *

UNITED STATES PATENT AND TRADEMARK OFFICE
CERTIFICATE OF CORRECTION

PATENT NO. : 6,806,435 B2
DATED : October 19, 2004
INVENTOR(S) : H. Ishiwata et al.

It is certified that error appears in the above-identified patent and that said Letters Patent is hereby corrected as shown below:

Title page,
Item [57], ABSTRACT,
Line 3, after "titable" insert -- turntable --.

Signed and Sealed this

Nineteenth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,806,435 B2
APPLICATION NO. : 10/108425
DATED : October 19, 2004
INVENTOR(S) : H. Ishiwata et al.

It is certified that error appears in the above-identified patent and that said Letters Patent is hereby corrected as shown below:

The title page showing an illustrative figure, should be deleted and substitute there for the attached title page.

Please delete Drawings sheets 1-6 and replace with Drawings sheets 1-7 attached.

Please delete Column 1, line 5 through Column 6, line 65, and replace them with Column 1 through Column 10 on the attached pages.

Signed and Sealed this

Sixth Day of March, 2007

JON W. DUDAS
*Director of the United States Patent and Trademark Office*

(12) United States Patent
Ishiwata et al.

(10) Patent No.: US 6,806,435 B2
(45) Date of Patent: Oct. 19, 2004

(54) SMALL HOLE ELECTRIC DISCHARGE MACHINE DRILL PROVIDED WITH DEPTH-SPECIFIC PROCESSING MEANS

(75) Inventors: Hiroshi Ishiwata, Kanagawa-ken (JP); Tomoshige Ishiwata, Kanagawa-ken (JP); Shigeharu Yokomichi, Kanagawa-ken (JP)

(73) Assignee: Elenix, Inc., Kanagawa-ken (JP)

(*) Notice: Subject to any disclaimer, the term of this patent is extended or adjusted under 35 U.S.C. 154(b) by 0 days.

(21) Appl. No.: 10/108,425

(22) Filed: Mar. 29, 2002

(65) Prior Publication Data
US 2002/0148814 A1 Oct. 17, 2002

(30) Foreign Application Priority Data

Apr. 12, 2001 (JP) .................... P2001-113882
May 8, 2001 (JP) .................... P2001-137691

(51) Int. Cl.[7] .................... B23H 1/00; B23H 9/14
(52) U.S. Cl. .................... 219/69.2
(58) Field of Search .................... 219/69.12, 69.11, 219/69.2, 69.14

(56) References Cited

U.S. PATENT DOCUMENTS

| | | | | |
|---|---|---|---|---|
| 4,055,988 A | * | 11/1977 | Dutton, Jr. | |
| 4,996,762 A | * | 3/1991 | Takayama | 219/69.11 |
| 5,174,586 A | * | 12/1992 | Saeda et al. | |
| 6,407,385 B1 | * | 6/2002 | Okada | 250/306 |
| 6,443,295 B1 | * | 9/2002 | Yasuda | |
| 6,576,858 B1 | * | 6/2003 | Yokomichi | 219/69.2 |

FOREIGN PATENT DOCUMENTS

| | | | |
|---|---|---|---|
| JP | 62-282825 A | * | 12/1987 |
| JP | 9-174340 A | * | 7/1997 |
| JP | 2000-202715 A | * | 7/2000 |

* cited by examiner

Primary Examiner—Geoffrey S. Evans
(74) Attorney, Agent, or Firm—Greenblum & Bernstein, P.L.C.

(57) ABSTRACT

A small hole electric discharge machine drill is provided with a depth-specific processor and a tiltable turntable unit operable in fluid. The turntable unit includes a first axis with a first center of rotation and a second tilting axis with a second center of rotation. The turntable unit is provided inside a work tank that may be filled with fluid. The small hole electric discharge machine drill includes an electrode for small hole processing.

9 Claims, 7 Drawing Sheets

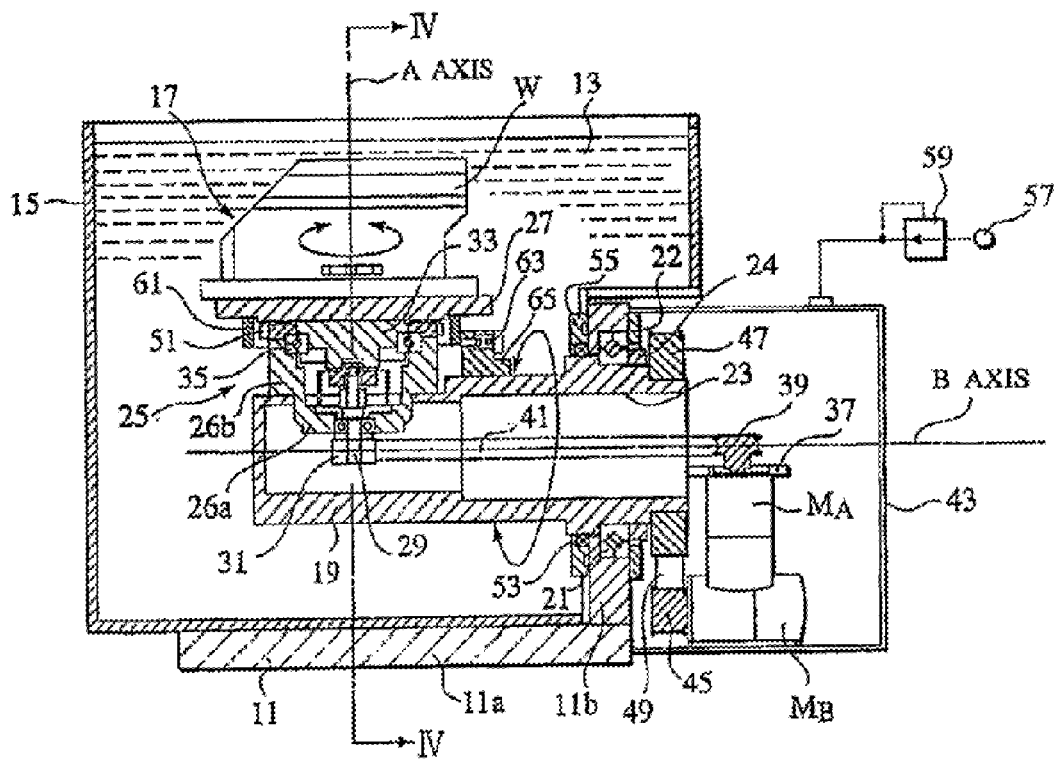

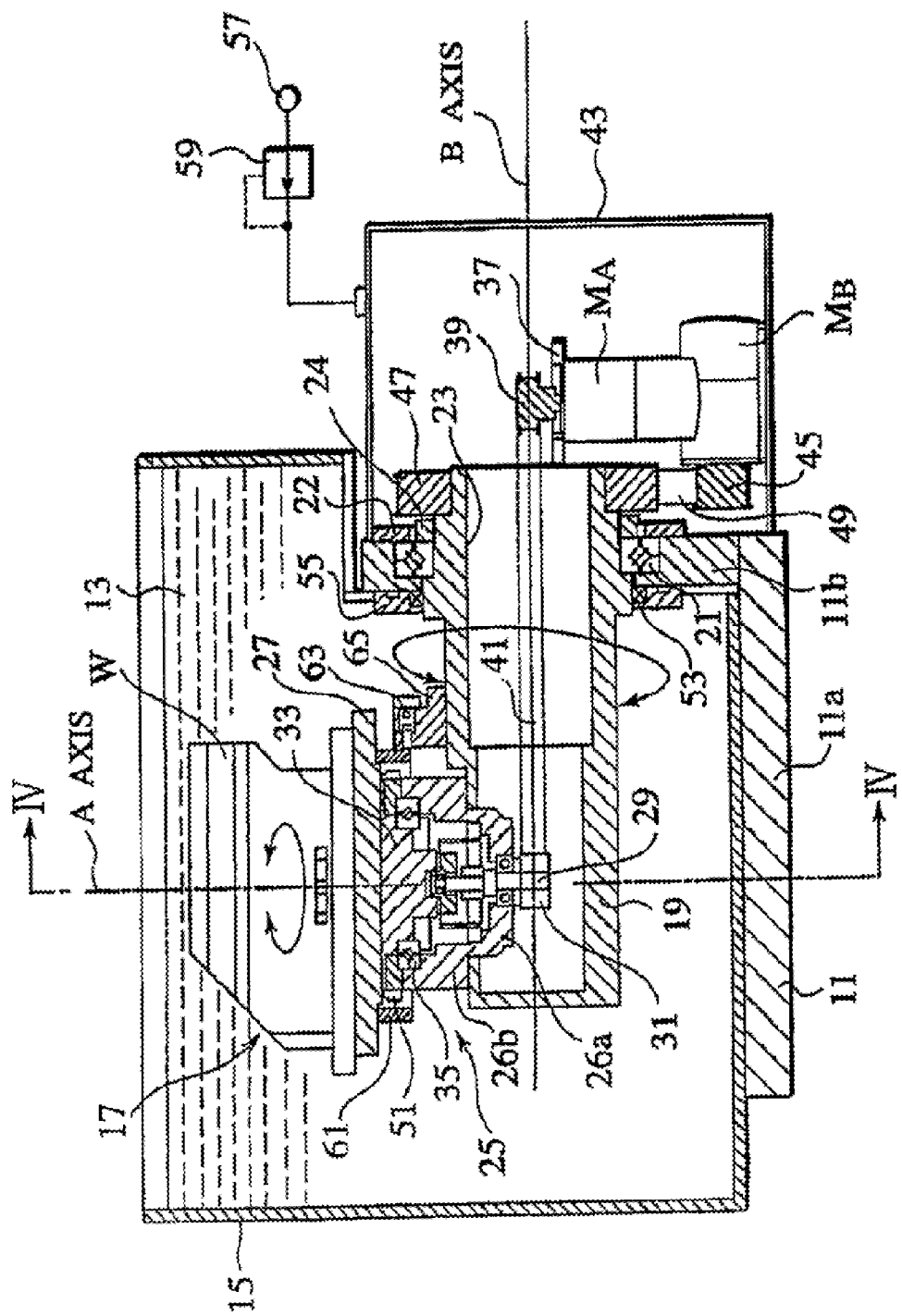

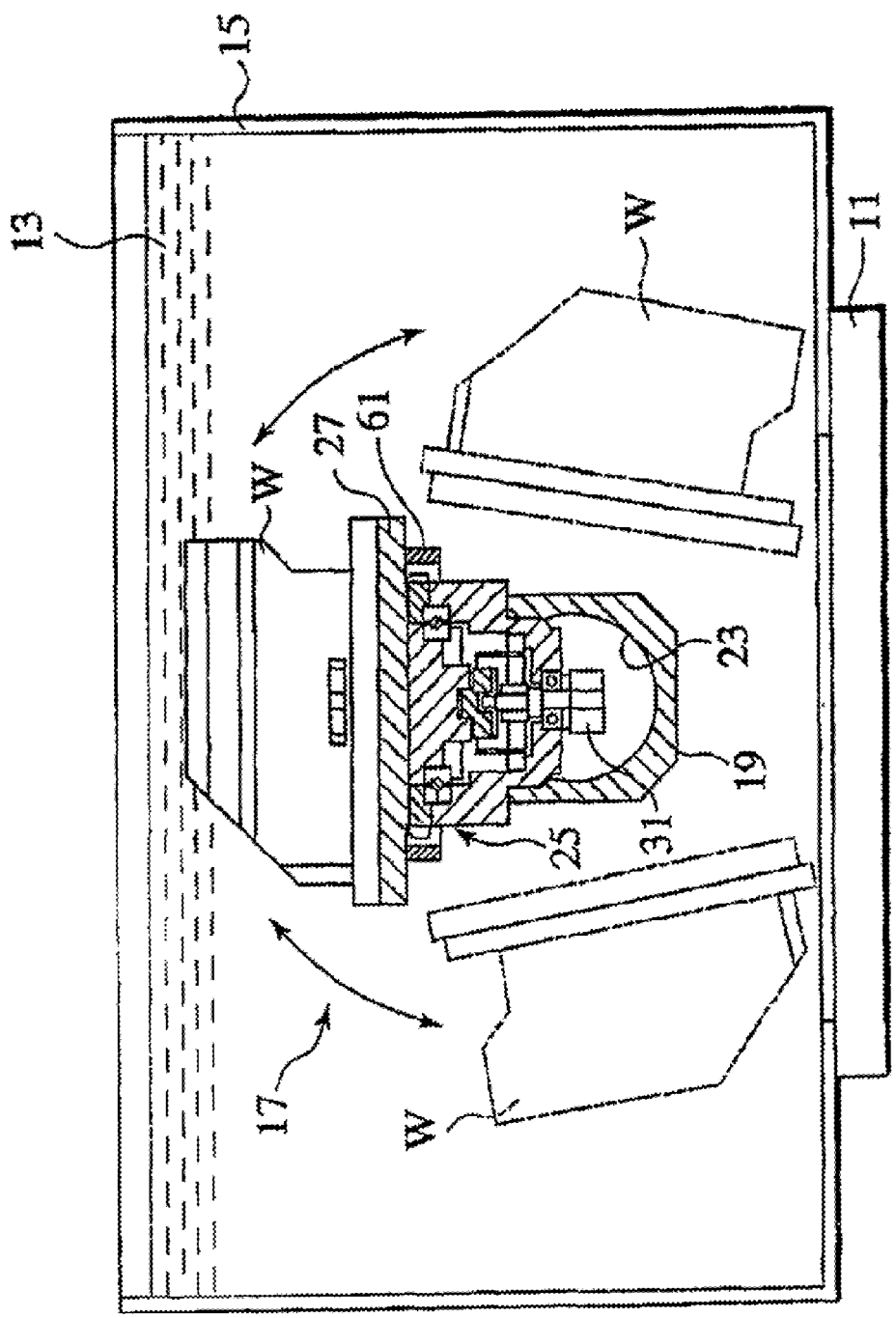

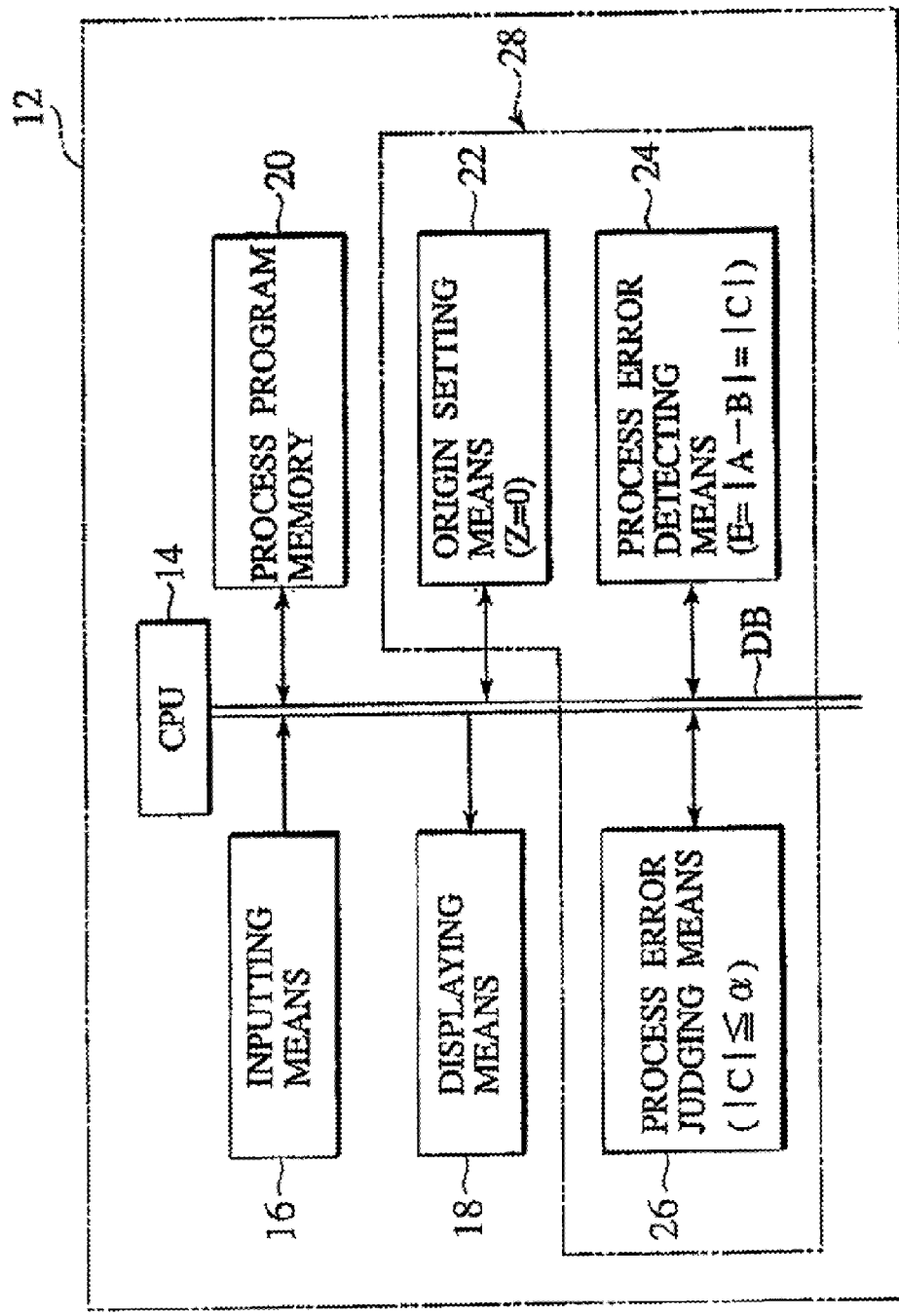

SMALL HOLE ELECTRIC DISCHARGE MACHINE DRILL PROVIDED WITH DEPTH-SPECIFIC PROCESSING MEANS

BACKGROUND OF THE INVENTION

1. Field of the Invention

The present invention relates to a small hole electric discharge machine drill provided with depth-specific processing means and with a turntable which is tiltable in water, and to a method of depth-specific processing with the small hole electric discharge machine drill.

2. Description of the Related Art

To date, there have been no small hole electric discharge machine drills (hereinafter referred to as "small hole EDM drills") provided with turntables which are usable in water as well as tiltable. Therefore, small hole processing with various inclinations with respect to a worked surface has been performed on a workpiece on a worktable set out in the air.

In the meantime, there are the following two methods of specifying depth of a processed small hole in a small hole processing method using a conventional small hole EDM drill.

1. A method that an attrition degree of an electrode to be used is measured in advance by test processing or the like, and then a depth-specific value (a Z-axis travel instruction value) is determined while reflecting the measured value.
2. A method that an attrition degree of an electrode to be used is measured in advance by test processing or the like in order to enhance precision of a depth of a processed hole, and processing takes place in a processing repetition frequency determined in advance in the event of processing according to a depth-specific value (a Z-axis travel instruction value) which reflects the measured value.

Now, description will be made a little more concretely regarding the foregoing second method.
(1) A tip of an electrode is aligned in a position on a surface of a workpiece and the position is set as an origin (Z=0) to initiate drilling, and then the workpiece is processed until a specified depth in accordance with the depth-specific value (the Z-axis travel instruction value) reflecting the above-described measured value.
(2) After the step (1) is finished, the tip of the electrode is aligned once again in the position on the surface of the workpiece and the position is set again as an initial point (Z=0) of processing (while canceling an attrition amount of the electrode), and then the workpiece is processed until the specified depth as set in the step (1).
(3) The step (2) is repeatedly performed in a specified frequency, and the process is completed.

SUMMARY OF THE INVENTION

However, conventional small hole processing by use of a bar pipe electrode has a problem that a process fluid from the inside of the pipe is not sufficiently supplied to a processed portion on an extracting edge of a processed hole thus causing aerial discharge, whereby the electric discharge becomes unstable and processing time is increased. There is also a problem that heat accruing from the electric discharge causes discoloration or deterioration of a workpiece, and incurs burrs on an entrance portion of the processed hole. Moreover, the above-described method 1 of the related art also has a problem that the attrition degree of the electrode varies depending on conditions of electric discharge processing (such as electric processing conditions, materials of electrodes and workpieces, and depths of processed holes, for example), therefore, it is difficult to find an accurate depth-specific value. In addition, measuring an attrition degree of an electrode requires a lot of time.

Meanwhile, regarding the method 2 of the related art, there is a problem that the frequency needs to be increased for enhancing precision of a depth of a processed hole, whereby processing time per hole becomes extremely long when high precision is expected.

The present invention has been made to resolve the foregoing problems. A first object of the present invention is to provide a small hole electric discharge machine drill provided with depth-specific processing means and with a tiltable turntable which is usable in water. In addition, a second object of the present invention is to provide a method of depth-specific processing upon small hole electric discharge processing with a small hole electric discharge machine drill, which does not require measurement of an attrition degree of an electrode prior to processing, and which is capable of processing a hole with a depth in a range of desired precision without specifying a repetition frequency.

BRIEF DESCRIPTION OF THE DRAWINGS

Figure 1:
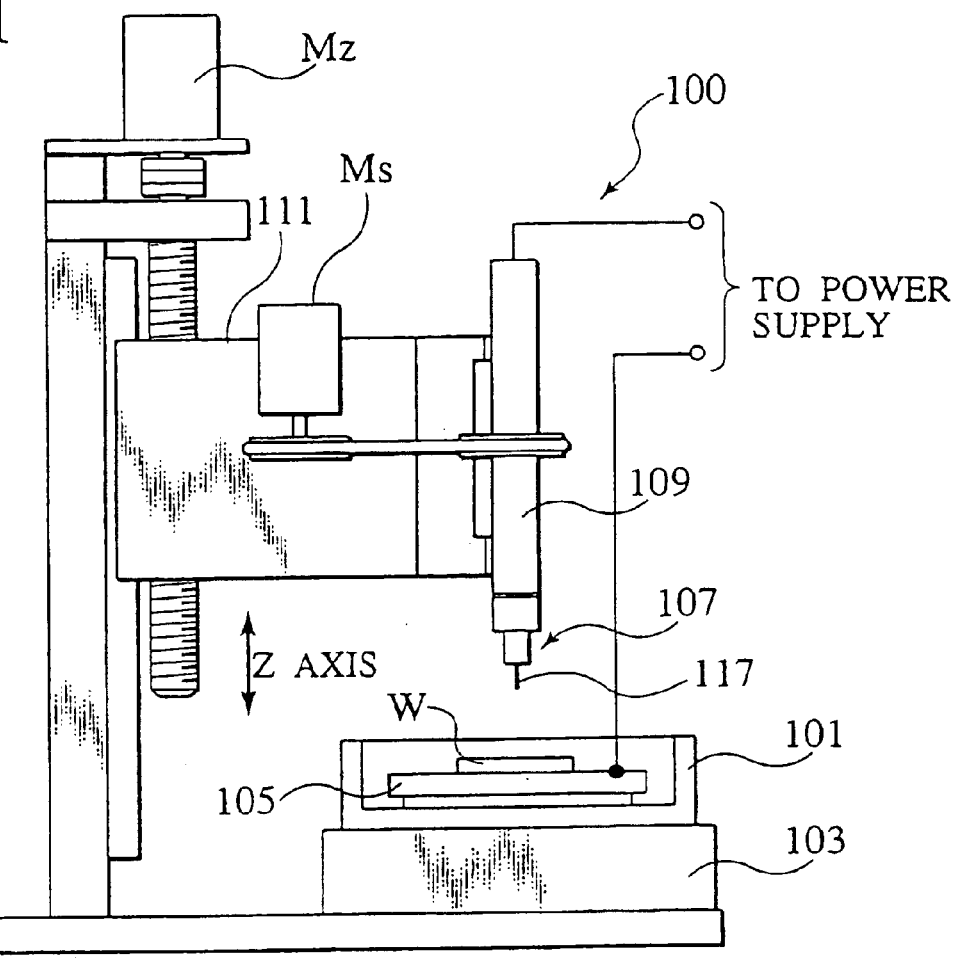
FIG. 1 is a view showing one example of a related small hole electrical discharge machining apparatus.

FIG. 1 is a front view showing a small hole electric discharge machine drill according to one embodiment of the present invention, which is provided with depth-specific processing means capable of depth-specific processing.

Figure 2:
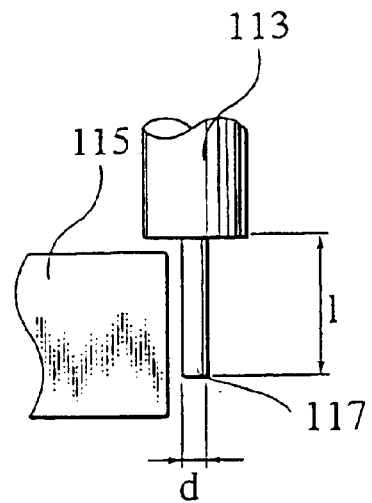
FIG. 2 is an explanatory view showing a shape of a fine electrode and a method of manufacturing the same in the related small hole electrical discharge machining apparatus.

FIG. 2 is a right side view of FIG. 1.

FIG. 3 is a partially enlarged view of a portion corresponding to a turntable unit 17 in FIG. 2.

FIG. 4 is a cross-sectional view taken along a line IV—IV in FIG. 3.

FIG. 5 is a block diagram describing a constitution of a CNC control unit provided with the depth-specific processing means according to the present invention.

FIG. 6 is a view for describing a relation between a processed hole and tolerance in the case of processing a small hole with a depth A.

FIG. 7 is a view for describing a process situation by the method of depth-specific processing according to the present invention upon small hole electric discharge processing.

FIG. 8 is a flowchart for describing processing steps of the method of depth-specific processing according to the present invention upon small hole electric discharge processing.

DESCRIPTION OF THE PREFERRED EMBODIMENT

Now, an embodiment of the present invention will be described with reference to the accompanying drawings.

FIG. 1 to FIG. 4 collectively show one embodiment of the present invention, which is a small hole electric discharge machine (EDM) drill 10 of six-axis control (X, Y, W, Z, A and B) provided with a computer numerical control (CNC) control unit.

On a pedestal 4 of the small hole EDM drill 10 as collectively illustrated in the drawings, provided is a Y-axis table 6 capable of traveling and aligning in a Y-axis direction by unillustrated driving means and by a Y-axis driving motor $M_y$.

A tray 7 is provided as integrally fixed to the Y-axis table 6. An insulative stone surface plate 9 is provided on the tray 7, and an L-shaped bracket member 11 is integrally provided on the stone surface plate 9.

A work tank 15 for containing a working fluid 13 such as low-conductive deionized water is fitted on the above-mentioned bracket member 11. A tiltable turntable unit 17 for fixing a workpiece W thereto is provided inside the work tank 15.

Now, description will be made further in detail regarding the above-mentioned turntable unit 17 with reference to FIG. 3 and FIG. 4.

The turntable unit 17 includes an A axis with the center of rotation on a shaft center parallel to a Z axis (in the longitudinal direction in FIG. 1 or FIG. 3), and a B axis (a tilting axis) with the center of rotation on a shaft center orthogonal to the A axis (parallel to a Y axis and orthogonal to an X axis).

A B-axis rotating shaft 19 as a driving portion of the above-mentioned B axis is rotatably supported by a B-axis fitting portion 11b via a bearing 21. Here, the B-axis fitting member 11b extends upward along a right side wall surface (on the right side in FIG. 2 or FIG. 3) of the work tank 15 from a horizontal bottom portion 11a of the L-shaped bracket member 11 on the stone surface plate 9. The B-axis rotating shaft 19 is provided so as to penetrate the right side wall surface of the work tank 15 and extend to almost a central portion inside the work tank 15.

An outer ring and an inner ring of the bearing 21 are fixed to the B-axis fitting portion 11b of the L-shaped bracket member 11 with an annular bearing holder 22 and an annular nut member 24.

On a shaft center portion of the B-axis rotating shaft 19, provided is a blind hole 23 which has an opening on a right end thereof and extends horizontally towards the vicinity of a left end thereof along the shaft center of the B-axis rotating shaft 19. Moreover, a turntable 27 is fitted to an upper portion on the left end of the B-axis rotating shaft 19 via a speed reducer 25 with a large axle ratio (about 1/100) such as Harmonic Drive™.

A bottom housing portion 26a of the above-mentioned speed reducer 25 is fixed to the B-axis rotating shaft 19 in a state of protruding inward the blind hole 23. An input shaft 29 for A-axis driving, which is rotatably supported by this bottom housing portion 26a, protrudes out of the bottom housing portion 26a. A timing pulley 31 is fitted to this input shaft 29.

Meanwhile, inside an upper housing portion 26b of the speed reducer 25, an output shaft 33 for A-axis driving is provided rotatably via a bearing 35. A bottom face of the above-mentioned turntable 27 is fixed integrally to an upper end of this output shaft with fastening parts such as screws (illustration omitted).

Moreover, an A-axis drive motor $M_A$ is fitted via a bracket 37. Here, the bracket 37 is fitted so as to stride across the opening of the blind hole 23 of the B-axis rotating shaft 19. A timing belt 41 is girded between a timing pulley 39 provided on an output shaft of this A-axis drive motor $M_A$ and the timing pulley 31 provided on the input shaft 29 of the speed reducer 25.

In addition, a B-axis drive motor $M_B$ for driving the B-axis rotating shaft 19 is provided inside an air chamber 43 which is fitted to the L-shaped bracket member 11. This air chamber 43 is provided so as to shut out the outside air from the opening of the blind hole 23 of the B-axis rotating shaft 19 and to surround and enclose the A-axis drive motor $M_A$ and the B-axis drive motor $M_B$.

Moreover, a timing pulley 45 is provided on an output shaft of the B-axis drive motor $M_B$, and a timing belt 49 is girded between a timing pulley 47 provided on an outside diametrical portion at a right end of the B-axis rotating shaft 19 and the timing pulley 45.

A space between the inside of the housing of the speed reducer 25 and the work tank 15 is sealed with a seal 51 to avoid infiltration of the working fluid 13 into the speed reducer 25. Moreover, an appropriate seal such as an O ring is also provided at an engaging portion of the bottom housing portion 26a and the blind hole 23 of the B-axis rotating shaft 19 to avoid infiltration of the working fluid 13 into the blind hole 23.

Moreover, a seal 53, a seal holder 55 and the like are also provided at an engaging portion where the B-axis rotating shaft 19 penetrates the wall surface of the work tank 15 in order to prevent leakage of the working fluid 13 to the outside of the tank. Furthermore, the air chamber 43 constitutes an airtight state by sealing off from the outside air, and simultaneously depressurizes the air from a pneumatic source 57 to about 1.1 atm. with a pressure reducing valve 59 for supplying the depressurized air into the air chamber 43 at any time, whereby the working fluid 13 is inhibited from leaking in the blind hole 23 and the air chamber 43.

On a back surface of the turntable 27, provided is an annular electroconductive ring 61 which is electrically conductive to the turntable 27. An electroconductive brush 63 which always contacts with this electroconductive ring 61 is supported by an electroconductive brush supporting member 65 provided on the B-axis rotating shaft 19.

Note that the electroconductive brush 63 and an electrode D are connected with an electric discharge power source (illustration omitted).

In the above-described constitution, it is possible to rotate the turntable 27 around the A axis by an appropriate angle if the A-axis drive motor $M_A$ is rotated appropriately under control of a control unit 12 to be described later. Similarly, it is possible to tilt the turntable 27 clockwise or counterclockwise if the B-axis drive motor $M_B$ is rotated normally or in reverse as appropriate. Furthermore, it is possible to align the turntable 27 in an arbitrary position in the Y-axis direction by appropriately rotating the Y-axis drive motor $M_Y$.

Now, while referring to FIG. 1 and FIG. 2, provided on the pedestal 4 at the back of the work tank 15 (at the right side in FIG. 1) is a gate frame 67, which is composed of right and left braces 67a and 67b and a beam member 67c laid over the right and left braces 67a and 67b.

A guide rail (illustration omitted) protected by bellows 69 is provided on the beam member 67c of the gate frame 67, and an X-axis carriage 71 is provided movably on this guide rail. In addition, provided on this X-axis carriage 71 is a Z-axis carriage 73, which can travel and be aligned to an arbitrary position along the Z axis (a processing axis) by a Z-axis drive motor $M_Z$. Note that the X-axis carriage 71 can be aligned to an arbitrary position along the X axis by an X-axis drive motor $M_X$. Moreover, provided on the Z-axis carriage 73 is a W-axis drive motor $M_W$, which moves the Z-axis carriage 73 to an appropriate height with respect to the X-axis carriage 71.

The hollow or solid bar electrode D for small hole processing is rotatably supported by the Z-axis carriage 73. In addition, provided is a motor (illustration omitted) for rotating the bar electrode D around the A axis. Moreover, working fluid supplying means (illustration omitted) for supplying the working fluid (such as deionized water) is provided when the bar electrode D is a hollow electrode (that is, a pipe electrode).

Fluid level controller 77 is provided on the work tank 15 for controlling a fluid level of the working fluid in accordance with a position of a surface of a workpiece. For example, the fluid level controller 77 has a constitution as follows.

As shown in FIG. 1, a notch 79 is provided on a sidewall of the work tank 15 from an upper portion thereof downward to a depth of H. Moreover, a gate 81 is provided as capable of ascending and descending along the notch 79 by appropriate guiding means (illustration omitted). A nut member 83 is provided integrally on the gate 81. A feed screw 85, which is rotated by a gate drive motor $M_c$ fitted to the work tank 15, is screwed into the nut member 83.

Note that the depth H of the above-mentioned notch 79 is designed as slightly lower than the position of the surface of the turntable 27 when the turntable 27 is in a horizontal position (when a B-axis rotation angle is at 0°).

The fluid level inside the work tank 15 can be arbitrarily set by moving the gate 81 of the above-described Fluid level controller 77 up and down by driving the gate drive motor $M_c$.

In other words, the working fluid 13 is arranged to be supplied to the work tank 15 at any time from a working fluid supplying unit (illustration omitted), and the working fluid 13 is arranged to overflow at any time from this notch 79 to the tray 7. A drain outlet 87 is provided on the tray 7, and the working fluid 13 is arranged to return to a tank of the working fluid supplying unit (illustration omitted) through the drain outlet 87.

Instead, the above-described Fluid level controller 77 may include a valve at a bottom portion of the work tank 15 and fluid level detector controlling drainage of the working fluid 13. Similar fluid level control is thereby feasible.

On the brace 67b of the gate frame 67, provided is a CNC control unit 12 which can control the six control axes (X, Y, W, Z, A and B) among others. This CNC control unit 12 can perform three-dimensional (X, Y and Z) alignment of the bar electrode D with respect to a workpiece W by controlling the X-axis drive motor $M_x$, the Y-axis drive motor $M_y$ and the Z-axis drive motor $M_z$.

As shown in FIG. 5, data inputting means 16 such as a keyboard, displaying means 18 such as a liquid crystal display device, a process program memory 20 and the like are connected to a data bus DB of a central processing unit 14 provided on the above-mentioned CNC control unit 12.

In addition, origin setting means 22 for setting an origin (Z=0) at initiation of drilling by contacting a tip of the bar electrode D onto a checking point P, process error detecting means 24 for finding a Z-axis coordinate (Z=C) when the tip of the bar electrode D contacts the surface of the workpiece and subsequently detecting an process error E (E=|A−B|=|C|) from the Z-axis coordinate C, and process error judging means 26 for judging as to whether or not the detected process error E remains within a range of tolerance α (|C|≦α) are connected to the data bus DB. Moreover, the origin setting means 22, the process error detecting means 24 and the process error judging means 26 collectively constitute depth-specific processing means 28.

In the above-described constitution, when small hole processing takes place, the workpiece W is fitted to the turntable 27 in the state that the working fluid 13 is drained out of the work tank 15. Thereafter, the working fluid 13 (such as deionized water) is injected until the surface of the workpiece W is soaked in the working fluid 13.

Subsequently, a distance between the surface of the workpiece W and the tip of the bar electrode, D is appropriately set by the W-axis drive motor $M_w$, as well as the X-axis drive motor $M_x$ and the Y-axis drive motor $M_y$ are appropriately driven to align the bar electrode D to desired X-Y coordinates on the workpiece W. Eventually, electric discharge processing can be performed while controlling travel of the bar electrode D along the Z axis by the Z-axis drive motor $M_z$.

Moreover, by rotating the A axis and the B axis of the turntable 27 by appropriate angles in the above-described small hole processing, it is possible to perform electric discharge processing on the workpiece W with respect to all surfaces except a bottom surface thereof without re-fitting the workpiece W to the turntable 27.

In addition, the fluid level of the working fluid 13 inside the work tank 15 can be controlled automatically by the Fluid level controller 77 so as to position slightly higher than the level of the surface of the workpiece W at any time.

Next, description will be made regarding a method of depth-specific processing with the above-mentioned small hole EDM drill with reference to the accompanying drawings.

FIG. 6 is a view showing a state of processing a small hole 1 of a depth A from the surface of the workpiece W. The depth of the processed hole, 1 should be sufficiently in a range A±α. Here, α denotes tolerance with respect to the depth A of the processed hole.

FIG. 7 is an explanatory view for a process situation by the method of depth-specific processing according to the present invention upon small hole electric discharge processing. FIG. 8 is a flowchart for describing processing steps of the method of depth-specific processing according to the present invention upon small hole electric discharge processing.

In the following, the processing steps of the method of small hole processing according to the present invention will be described with reference to FIG. 7 and FIG. 8.

In the case of processing the small hole 1 with the depth in the range A±α, for example, a process program is registered with the process program memory 20 provided on the CNC control unit 12 of the six-axis control (X, Y, W, Z, A and B) small hole EDM drill 10 shown in FIG. 1 (Step S1). Here, the process program includes position coordinates (X, Y) of the processed hole, the depth (A) of the processed hole, the tolerance (α) with respect to the depth (A), a diameter of the processed hole, electric processing conditions and the like.

Subsequently, the electrode D is moved toward a position above the origin check point P which is set up in an arbitrary position on the surface of the workpiece W in order to confirm a Z-axis origin of the bar electrode D, and then the electrode D is moved toward a negative direction of the Z axis, that is, downward to the surface of the workpiece W, whereby the Z-axis coordinate in the event that the tip of the electrode D contacted the surface of the workpiece W is set to Z=0 (or reset to Z=0) (Step S2).

A publicly-known detecting method is used for contact detection of the electrode D with the surface of the workpiece W. For example, one of publicly-known detecting methods is to detect electric conduction between the electrode D and the workpiece W. In addition, the electrode D is designed to stop traveling along the Z axis immediately upon contact detection.

Subsequently, the electrode D is lifted up and moved to the position (X, Y) to perform processing, and then the electrode D is moved downward along the Z axis until the Z-axis coordinate thereof reaches Z=−A, thus drilling the small hole 1 of a specified processing depth of A (Step S3).

In the above-mentioned process until the specified processing depth of A, the tip of the electrode D is consumed during electric discharge processing and thereby shortened. Accordingly, if a depth of the small hole actually processed is B and a consumed length of the electrode D is C, then B=A−C+δ. Here, δ denotes an electric discharge gap between the tip of the electrode and the bottom of the processed hole, which is a very small value in a range from about 0.005 mm to 0.01 mm. Therefore, if precision of the depth specification of the processed hole can ignore δ, then the depth B of the small hole actually processed can be calculated as B=A−C assuming that δ=0. In the following, description will be made based on the assumption that δ=0.

Subsequently, the tip of the electrode D is lifted up from the Z-axis coordinate Z=0 and moved to a position above the check point P (Step S4). At the check point P, the tip of the electrode D is moved down to contact the surface of the workpiece W, and then a Z-axis coordinate where the tip of the electrode D contacts the workpiece W is determined as Z=C (Step S5).

The above-described Z-axis coordinate Z=C coincides with the consumed length of the electrode D upon processing until the specified processing depth A in Step S3. In other words, the consumed length C of the electrode D in Step S3 is thereby found. Therefore, if a process error is E, then:

$$E=|A-B|=|C| \quad (1)$$

Subsequently, condition judgment (Step S6) takes place as to whether or not the error E (=|C|) of the processed hole in Step S3 remains within the tolerance α; that is:

$$|C| \leq \alpha \quad (2)$$

If such a condition is not satisfied, then a routine from Step S2 to Step S6 will be iterated until the condition is satisfied in Step S6.

When the condition is satisfied in Step S6, small hole processing in this processing position is completed. In this event, the depth B of the small hole actually processed remains in a range $A+\alpha \geq B \geq A-\alpha$, as derived from the formulas (1) and (2).

What is claimed is:

1. A small hole electric discharge machine drill comprising:
    a turntable having rotation axes of a first axis, of which a center of rotation is defined as a shaft center parallel to a processing axis, and a second axis, of which a center of rotation is defined as a shaft center orthogonal to the first axis,
    wherein the turntable is provided inside a work tank for filling a working fluid therein; and
    a fluid level controller for controlling a fluid level of the working fluid inside the work tank in a level slightly higher than a surface of a workpiece.

2. The small hole electric discharge machine drill according to claim 1,
    wherein the fluid level controller comprises:
    a notch provided on a side wall of the work tank from an upper portion thereof downward;
    a gate which ascends and descends along the notch;
    a nut member fitted to the gate; and
    a driving portion which rotates the nut member, and the excess working fluid is allowed to overflow from the notch by moving the gate up and down by the driving portion.

3. A small hole electric discharge machine drill comprising:
    a drilling electrode configured to be movable along a processing axis of the small hole electric discharge machine drill, and
    a turntable having rotation axes of a first axis, of which a center of rotation is defined as a shaft center parallel to the processing axis, and a second axis, of which a center of rotation is defined as a shaft center orthogonal to the first axis,
    wherein the turntable is provided inside a work tank configured to be filled with a working fluid.

4. The small hole electric discharge machine drill according to claim 3,
    wherein the turntable is disposed rotatably on one end inside the work tank of a second axis rotating shaft which extends from an outside of the work tank to an inside thereof,
    the second axis rotating shaft is provided with a blind hole which has an opening outside the work tank and extends to an end portion inside the work tank,
    a first axis drive motor is provided outside the work tank via the blind hole for rotating the turntable, and
    a second axis drive motor is provided outside the work tank for driving the second axis rotating shaft.

5. The small hole electric discharge machine drill according to claim 4, further comprising:
    an air chamber to shut out outside air from the blind hole of the second axis rotating shaft,
    wherein the first axis drive motor and the second axis drive motor are disposed inside the air chamber, and air at about 1.1 atm. is always supplied to the air chamber from a pneumatic source.

6. The small hole electric discharge machine drill according to claim 3, further comprising:
    a fluid level controller for controlling a fluid level of the working fluid inside the work tank in a level slightly higher than a surface of a workpiece.

7. The small hole electric discharge machine drill according to claim 6,
    wherein the fluid level controller comprises:
    a notch provided on a side wall of the work tank from an upper portion thereof downward;
    a gate which ascends and descends along the notch;
    a nut member fitted to the gate; and
    a driving portion which rotates the nut member, and the excess working fluid is allowed to overflow from the notch by moving the gate up and down by the driving portion.

8. A small hole electric discharge machine drill comprising:
    a turntable having rotation axes of a first axis, of which a center of rotation is defined as a shaft center parallel to a processing axis, and a second axis, of which a center of rotation is defined as a shaft center orthogonal to the first axis,
    wherein the turntable is provided inside a work tank for filling a working fluid therein, and
    wherein the turntable is disposed rotatably on one end inside the work tank of a second axis rotating shaft which extends from an outside of the work tank to an inside thereof,
    the second axis rotating shaft is provided with a blind hole which has an opening outside the work tank and extends to an end portion inside the work tank,
    a first axis drive motor is provided outside the work tank via the blind hole for rotating the turntable, and
    a second axis drive motor is provided outside the work tank for driving the second axis rotating shaft.

9. The small hole electric discharge machine drill according to claim 8, further comprising:

an air chamber to shut out outside air from the blind hole of the second axis rotating shaft,
wherein the first axis drive motor and the second axis drive motor are disposed inside the air chamber, and air at about 1.1 atm. is always supplied to the air chamber from a pneumatic source.

* * * * *